Nov. 14, 1950
E. J. GILMORE ET AL
2,529,654
RECIPROCATING MEASURING POCKETS
HAVING VOLUME VARYING MEANS
Filed July 23, 1946
2 Sheets-Sheet 1
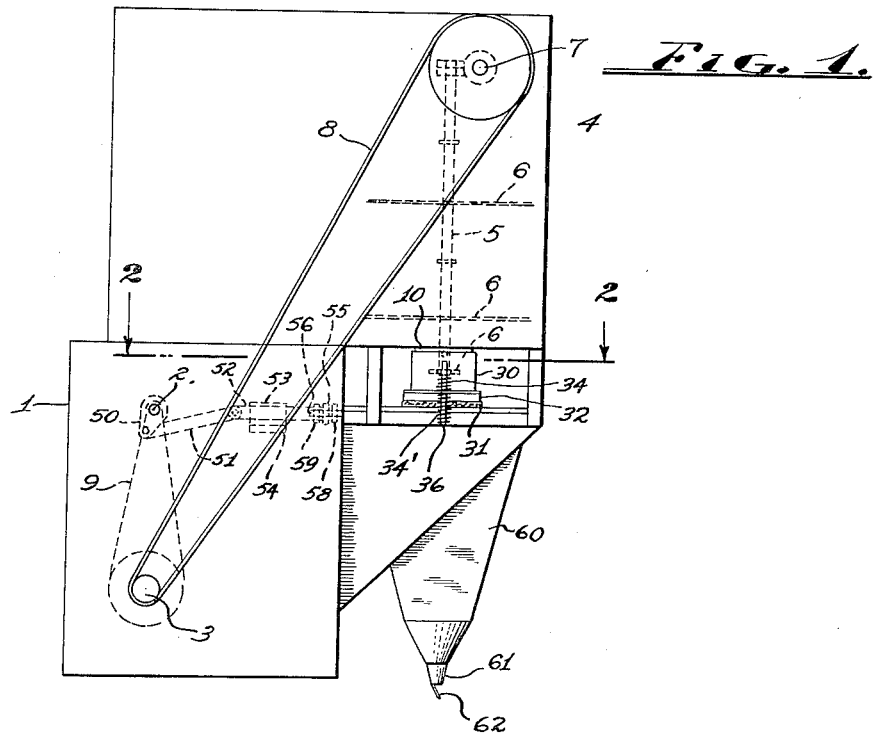
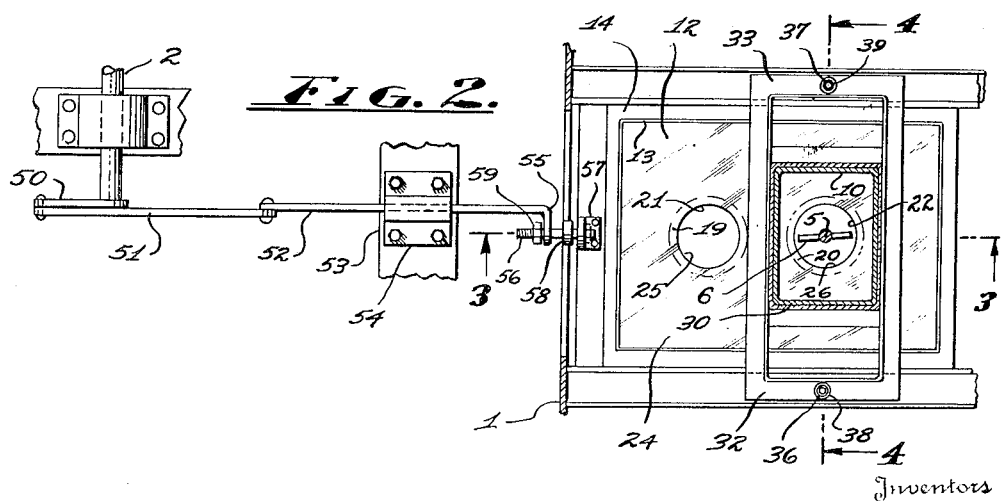
Inventors
EMMET J. GILMORE
ERNEST P. LUTZ
ZOLTAN LUTZ
R. S. Berry
Attorney

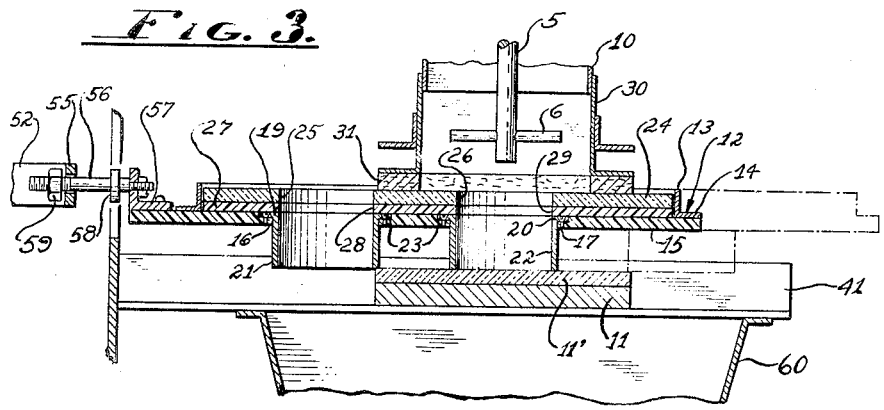
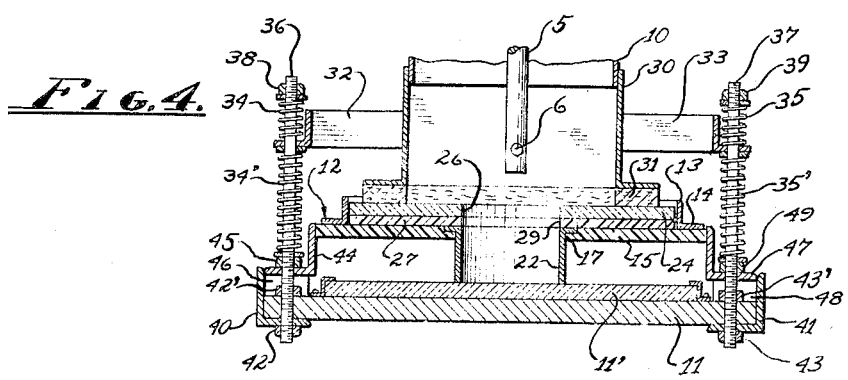
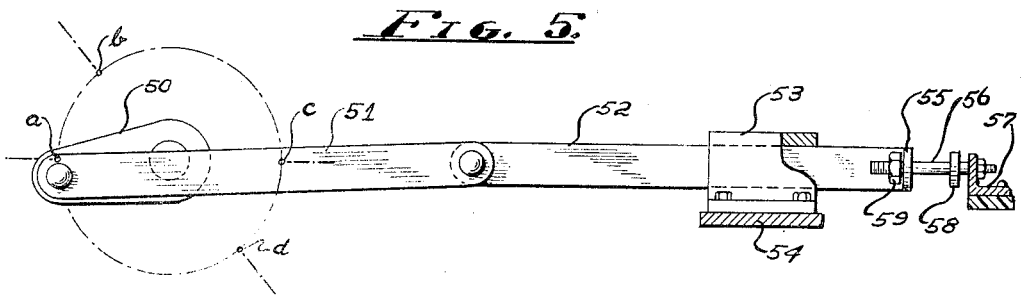
Inventors
EMMET J. GILMORE
ERNEST P. LUTZ
ZOLTAN LUTZ Patented Nov. 14, 1950

2,529,654

UNITED STATES PATENT OFFICE 2,529,654

RECIPROCATING MEASURING POCKETS HAVING VOLUME VARYING MEANS

Emmett J. Gilmore, Montrose, and Ernest P. Lutz and Zoltan Lutz, Los Angeles, Calif.

Application July 23, 1946, Serial No. 685,670

5 Claims. (Cl. 222—305)

This invention relates to machines for filling bags or other receptacles with measured quantities of pulverulent materials and while particularly adapted for handling light weight, slightly tacky materials such as soap powders is equally useful for more freely flowing materials.

In the packaging of certain powdery or granular materials which are soluble in water or oil or which tend to become fluid upon application of heat or which are abrasive, a great deal of trouble has heretofore been experienced in the maintenance of packaging machines due to the fact that a certain amount of material escapes and settles in bearing surfaces and gradually forms a gummy, sticky mass which, if not cleaned out periodically, will slow up the machine and sometimes through the resistance thus created result in the breakage of parts or complete operational failure. Oftentimes the cleaning of the machine involves the substantial disassembling of the mechanism to remove the accumulated material or replacement of worn out parts.

Still further, in the case of materials such as salt, bath salts in powdered form or powdered sulphur, the dust attacks the metal and enters and destroys bearing surfaces and in many cases the materials produce an abrasive action which causes damaging wear, all with attendant high repair and part replacement costs.

With these deficiencies of existing apparatus in mind, it is an object of the present invention to provide a machine for measuring and delivering measured charges of fluent or pulverulent materials in which all lubricated bearing parts are housed from the entrance of and contact with dust and in which those moving parts which are in direct contact with the material and are in bearing contact with other parts of the structure are so constructed and arranged as to withstand damaging wear and make frequent replacement unnecessary.

A further object of the invention is to provide a device for delivering charges of fluent materials in which the bearing faces of the charge forming elements are formed of different materials, so as to resist undue wear or adhesion of the powdered material.

A still further object of the invention is to provide a device for delivering charges of fluent materials in which the charge forming elements are so constructed and arranged to permit adjustment as to the quantity of charge to be delivered without the necessity of dismantling the machine.

A still further object of the invention is to provide a device for delivering charges of fluent materials including a moving element so guided that any powder or dust coming between vertically disposed guiding faces will be discharged from those faces and away from the machine.

Still another object of the invention is to provide a device for delivering measured charges of fluent and pulverulent materials including a reciprocable member having a plurality of charge determining pockets so disposed relative to the material supply and discharge passages that one pocket is being filled while another pocket is discharging a previously received charge.

A still further object of the invention is to provide a device for delivering measured charges of fluent materials in which the driving devices for actuating the charge determining means is constructed and arranged to provide an appreciable dwell during the times charges are being received and discharged to assure accurate metering and the continued operation of the machine over long periods of time without shutdown.

A still further object of the invention is to provide a charge forming and delivering apparatus in which one side of each of the bearing surfaces which guide it is formed of glass or other vitreous material.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevation of a machine embodying an illustrative embodiment of the invention, Fig. 2 is a top plan sectional view taken on the line 2—2 of Fig. 1, Fig. 3 is an enlarged sectional side elevation of the charge forming apparatus taken on the line 3—3 of Fig. 2, Fig. 4 is an enlarged sectional end elevation taken on the line 4—4 of Fig. 2, and Fig. 5 is a diagrammatic illustration of the mode of operation of the dwell producing means incorporated in the charge forming apparatus during mechanism.

Referring to the drawings, the illustrated embodiment of the invention comprises a frame structure 1 which supports a suitable source of power including a main drive shaft 2 and a countershaft 3. Mounted on the frame 1 is a hopper or container 4 for a supply of material to be measured and discharged in the manner hereinafter disclosed. Mounted in the hopper 4 is a vertically rotatable agitator 5 provided with a series of blades 6 and driven from a horizontal shaft 7 by suitable gearing and the shaft 7 may in turn be connected for actuation by the drive shaft 2 through the countershaft 3 and connecting chains or belts 8 and 9. The lower end of the agitator extends below the bottom wall of the hopper 4 and into a depending rectangular spout portion 10 depending therefrom.

The frame structure 1 further supports beneath the end of the spout portion 10 a slide support 11 the upper face of which is horizontally disposed and which preferably is provided with a bearing surface 11' of glass or other vitreous substance. Mounted for reciprocation on the slide support 11 is a charge measuring and receiving slide assembly 12 comprising a rectangular outer frame formed of angle members with an upwardly disposed vertical portion 13 and an outwardly disposed horizontal flange portion 14 and having fixed to the lower face thereof a bottom plate 15 which plate is provided with a pair of apertures 16 and 17 counterbored at the upper face thereof to receive the flange portions 19 and 20 of a pair of sleeves 21 and 22 secured to the bottom plate by any suitable means such as screws 23. The lower ends of the sleeves protrude through the apertures 16 and 17 respectively and engage the upper face 11' of the slide support 11 and preferably are formed of metal for a purpose hereinafter to be more fully explained.

Fitting loosely within the perimeter of the flange portions 13 is a plate of glass or other vitreous material 24 provided with apertures 25 and 26 which preferably are of the same size as the inner diameter of the sleeves 21 and 22 and are in registry therewith. Also, if desired, a spacing shim 27 provided with apertures 28 and 29 may be interposed between the plate 24 and the bottom plate 15. Such shims of varying thickness may be interposed to vary the volume of charges measured and delivered, or if desired the shim can be omitted completely. Since the plate 24 merely lies within the vertical flange portion 13 it is necessary only to lift it out of insert to remove the shim elements.

Slidably engaging the outer perimeter of the hopper spout portion 10 is a sleeve element 30, the lower end of which terminates in a rectangular pad 31 of felt or the like. The sleeve element 30 is further provided with laterally extending bracket portions 32 and 33 which are engaged between compression springs 34 and 34' and 35 and 35' carried by upstanding studs 36 and 37 fixed to the frame structure. Suitable nut elements 38 and 39 engaging the upper ends of the springs provide means whereby the pressure exerted thereby may be adjusted. It will be noted that the springs 34 and 35 not only hold the pad 31 in tight frictional engagement with the upper surface of the charge measuring element 12 represented by the upper surface of the plate 24 but through such pressure also operates to maintain the lower face thereof represented by the ends of the sleeves 21 and 22 in tight frictional engagement with the slide support 11.

The frame structure also includes a pair of horizontally disposed spaced forwardly projecting arms 40 and 41 in the form of angle irons with their vertical members projecting upwardly and their horizontal members facing each other. Intermediate their ends, the arms 40 and 41 support the slide support 11 which is secured thereto by the lower ends of the studs 36 and 37 by means of nuts 42 and 42' associated with the stud 36 and nuts 43 and 43' associated with the stud 37 as clearly shown in Fig. 4. Also carried by the arm 40 is a parallelly disposed guide member 44 formed of angle iron and spaced from the arm 40 by spacing blocks disposed at either side of the stud 36, one of which is shown at 46 in Fig. 4. The stud 36 carries a nut 45 which engages the upper face of the horizontal leg of the guide member to clamp it in position. Further, the nut 45 serves as an abutment for the spring 34'. The arm 41 is provided with a similar guide member 47 spaced therefrom by spacing blocks one of which is shown at 48 in Fig. 4 and a nut 49 on the stud 37 operates to hold the guide member in place and to serve as an abutment for the spring 35'.

As most clearly shown in Fig. 4, the guide members 44 and 47 are positioned with their vertical leg portions facing each other and they are so spaced as to provide a free working fit with the side edges of the plate 15 and the horizontal flange portions 14 of the frame carried by the plate 15. Referring now to Figs. 1, 3 and 5 the member 12 is reciprocated by means comprising a crank arm 50 attached to the shaft 2 which crank arm is connected to one end of a pitman 51 whereof the other end is connected to a rod 52 guided for reciprocation at 53 in a portion of the frame structure 54. The other end of the rod 52 is provided with a right angle portion 55 through which a stud 56, secured to one end of the plate 15 by a bracket 57, projects. The stud is provided with a stop collar 58 and a nut 59 disposed on opposite sides of the portion 55 of the connecting rod 52 with considerable play to afford a lost motion connection of considerable magnitude. Referring particularly to Fig. 5 and assuming that the crank is rotating in a clockwise direction it will be noted that the element 12 has nearly reached its extreme of movement to the left, which position will be reached when the crank arm reaches the position $a$. Continued rotation of the crank arm will cause the end 55 of the connecting rod 52 to move along the stud until it engages the stop collar 58 at which point the crank arm 50 will be at or about the position $b$, after which the element 12 will be shifted to the right until the crank arm reaches the position $c$. Further rotation of the crank to position $d$ will move the connecting rod to the left until it engages the nut 59 after which continued rotation will shift the element 12 to the left again.

The operation of the device is as follows: As has been explained the element 12 is reciprocated by the connection with the shaft 2 and the extent of this movement is most clearly shown in Fig. 3 wherein the element is shown in full lines at one end of the stroke and in dotted lines at the other extreme position. In the full line position the charge measuring pocket defined by the sleeve 22 and the corresponding apertures in the plate 24 and shim 27 is beneath the spout 10 and sleeve 30 and is closed at the bottom by engagement with the plate 11' and in that position is receiving a charge from the hopper generally by gravity, although the agitator 6 may be so shaped as to add a packing action if desired. At the same time the charge measuring pocket formed by the sleeve 21 has been moved clear of the edge of the plate 11' allowing a previously received charge to drop into a hopper element 60 fixed to the underside of the frame members 40 and 41. The hopper may terminate in any desired form of delivery spout to accommodate the type of receptacle being filled, the form shown at 61 being a type commonly used for small envelopes or bags and having a tongue 62 adapted to assist in the proper placement of the bag. As above explained the drive mechanism is provided with a lost motion connection at each end of the working stroke adapted to produce a pronounced dwell which in the proportions shown is of the order of one-third of the time required by the shaft 2 to make a half revolution. This is a decided advantage in handling materials such as both powders which due to their fluffiness and slightly tacky characteristics are inclined to be slow flowing and due to this dwell there is assurance that the charge measuring pockets will receive a full charge and when emptied that there will be sufficient time to insure the entire charge will be dropped.

When the element 12 is shifted to the other end of its stroke, the felt pad 31 being held in frictional engagement with the plate 24 will prevent the escape of any material therebetween and the same frictional load will prevent the escape of material between the bottom of the sleeve 22 and the plate 11' as the element is shifted to the right in which position the sleeve 22 is moved beyond the edge of the plate 11' to drop its charge into the hopper 60.

Mention has been made of the use of vitreous materials for certain of the bearing surfaces. It has been found that in the handling of certain materials such as soap powders, and some other materials that where the bearing surfaces are formed of the same or similar metals that heat generated by such bearing engagement tends to melt the powdered material and to cause it to generate even more heat by the increased frictional resistance necessitating the frequent dismantling of the machine for cleaning. It was discovered that by making one of each of the bearing surfaces of glass and the opposing surface of non-vitreous material such as brass or felt that this difficulty was satisfactorily overcome.

Furthermore in machines previously attempted to be used for measuring materials of the character for which the present machine was especially designed, the guideways for reciprocating elements tended to collect dust and to become clogged in the same manner as has been discussed in connection with other bearing surfaces. In the present invention it will be noted that the lateral guides 44 and 47 engage only the side edges of the plate 15 and thus any dust or material entering therebetween will drop to the floor.

Thus there has been created a machine which is particularly adapted for use in packaging materials which in the past have been almost impossible to package economically by machine due to the character of the material, which machine is exceedingly simple in construction and subject to economical operation and maintenance. While certain of its structural features render it particularly adapted for certain specific uses, the same features are not such as to confine its usefulness to those materials and it may be readily used for packaging any pulverulent material.

While we have shown and described a specific embodiment of our invention, we do not limit ourselves to the exact details of construction set forth, and the invention embraces such changes, modifications and equivalents of the parts and their formation and arrangement as come within the purview of the appended claims.

We claim:

1. In a filling machine, a fixed hopper having a discharge spout, a sleeve slidable on and depending from said spout, a frame, a slide support fixed to said frame below said sleeve, a reciprocable slide assembly guided in said frame between said slide support and said sleeve and including plates mounted one upon the other and having registering openings therein adapted to register with said sleeve, measuring sleeves fixed to and depending from the lowermost of said plates in line with said openings and having their lower ends slidably mounted on said slide support, a yieldable pad carried by said slidable sleeve and contacting the uppermost of the plates of said slide assembly to prevent leakage between the slidable sleeve and said slide assembly; spring means associated with said frame, said slidable sleeve and said slide assembly for yieldably urging said pad on the sleeve against said uppermost plate and yieldably urging said measuring sleeves against said slide support and means for reciprocating said slide assembly, said slide support being arranged to maintain the lower end of said measuring sleeves closed only when said measuring sleeves are in registry with said slidable sleeve on the spout.

2. In a filling machine, a fixed hopper having a discharge spout, a sleeve slidable on and depending from said spout, a frame, a slide support fixed to said frame below said sleeve, a reciprocable slide assembly guided in said frame between said slide support and said sleeve and including a plate having openings therein for registry with said slidable sleeve and measuring sleeves having their upper ends in fixed registry with said openings and their lower ends arranged to slide on and be closed by said slide support only when said openings are in registry with said slidable sleeve, means providing a seal to prevent leakage of material between said slide assembly and the lower end of the slidable sleeve on said spout, said slide assembly being vertically movable as well as reciprocable; spring means associated with said slide means and said frame for urging said slide means in a direction for forcing said measuring sleeves against said slide support and means for reciprocating said slide assembly.

3. In a filling machine, a hopper having a discharge spout, a frame, a plate-like slide support fixed to said frame below said spout, a reciprocable slide assembly guided by said frame between said spout and said slide support; said slide assembly including plates mounted one upon the other and having corresponding registering openings therein adapted to be brought into and out of registry with said spout on reciprocation of said slide assembly, there being sleeves fixed to and depending from the lowermost of said plates in line with said openings and having their lower ends in slidable contact with said plate-like slide support; said plate-like slide support supporting said slide assembly for vertical movement as well as reciprocatory movement and acting to close the lower ends of said measuring sleeves only when the latter and said openings are in registry with said spout, means forming a seal between said spout and the uppermost plate of said slide assembly, spring means operable through said sealing means for yieldably urging said slide assembly in a direction for forcing the lower ends of said measuring sleeves against said slide support and means for reciprocating said slide assembly.

4. In a filling machine, a hopper having a discharge spout, a sleeve vertically slidable on and depending from said spout, a yieldable sealing pad carried on the lower end of said sleeve, a frame, a reciprocable and vertically movable slide assembly horizontally guided in said frame and including a plate having its upper surface in sealing and sliding contact with said pad and provided with openings adapted to be brought into and out of registry with the sleeve on said spout, said slide assembly also including measuring sleeves fixed thereto with their upper ends in registry with the openings in said plate; a plate-like slide support on which the lower ends of said measuring sleeves are slidably contacted and which supports said slide assembly by reason of such contact with said measuring sleeves, said slide support closing said measuring sleeves only when said openings in said plate are in registry with the sleeve on said spout and being dimensioned so that said measuring sleeves will move clear thereof for discharging material therefrom during reciprocatory movement of said slide assembly, a spring means associated with said frame and the sleeve on said spout for yieldably urging the sleeve on the spout toward said slide assembly and the latter toward said slide support, and means for reciprocating said slide assembly.

5. In a filling machine, a hopper having a discharge spout, a sleeve vertically slidable on and depending from said spout, a yieldable sealing pad carried on the lower end of said sleeve, a frame, a reciprocable and vertically movable slide assembly horizontally guided in said frame and including a plate having its upper surface in sealing and sliding contact with said pad and provided with openings adapted to be brought into and out of registry with the sleeve on said spout, said slide assembly also including measuring sleeves fixed thereto with their upper ends in registry with the openings in said plate; a plate-like slide support on which the lower ends of said measuring sleeves are slidably contacted and which supports said slide assembly by reason of such contact with said measuring sleeves, said slide support closing said measuring sleeves only when said openings in said plate are in registry with the sleeve on said spout and being dimensioned so that said measuring sleeves will move clear thereof for discharging material therefrom during reciprocatory movement of said slide assembly, a spring means associated with said frame and the sleeve on said spout for yieldably urging the sleeve on the spout toward said slide assembly and the latter toward said slide support, and means for reciprocating said slide assembly, said slide assembly also including a bottom plate on which said first named plate is removably supported and a frame on said bottom plate embracing the edges of said first named plate for retaining the latter on the bottom plate.

EMMETT J. GILMORE.
ERNEST P. LUTZ.
ZOLTAN LUTZ.

REFERENCES CITED

The following references are of record in the file of this patent:

UNITED STATES PATENTS

| Number | Name | Date |
|---|---|---|
| 470,475 | Craney | Mar. 8, 1892 |
| 2,369,251 | Reynolds | Feb. 13, 1945 |
| 2,417,700 | McCarty | Mar. 18, 1947 |